March 13, 1962 F. R. LARRAD 3,025,071
LOCATING OR HOLDING DEVICES
Filed March 25, 1960 2 Sheets-Sheet 1

Inventor:-
Frederick Reginald Larrad
By Watson, Cole, Grindle & Watson
Attorneys March 13, 1962 F. R. LARRAD 3,025,071
LOCATING OR HOLDING DEVICES
Filed March 25, 1960 2 Sheets-Sheet 2

Inventor:-
Frederick Reginald Larrad

By Watson, Cole, Grindle & Watson
Attorneys

United States Patent Office 3,025,071
Patented Mar. 13, 1962

3,025,071
LOCATING OR HOLDING DEVICES
Frederick Reginald Larrad, Weston-in-Arden, Nuneaton, England, assignor to Larrad (Hydrajaws) Limited, Coventry, England, a British company
Filed Mar. 25, 1960, Ser. No. 17,641
Claims priority, application Great Britain May 19, 1959
2 Claims. (Cl. 279—4)

The object of this invention is to provide improved locating or holding devices for use in locating or holding articles such as work pieces of tubular, cylindrical or similar form.

A particular object of the invention is to provide such a device in the nature of a mandrel for internally locating or holding hollow or tubular work pieces.

Figure 1:
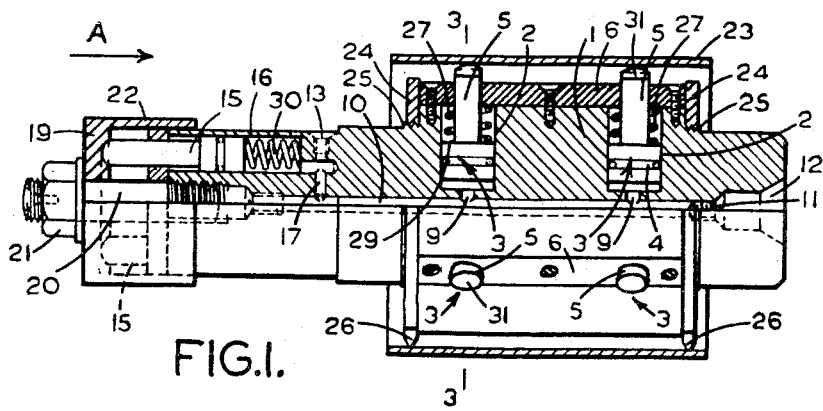
FIGURE 1 is an elevation partly in axial plane section of a device according to this invention in the form of a mandrel.
Figure 2:
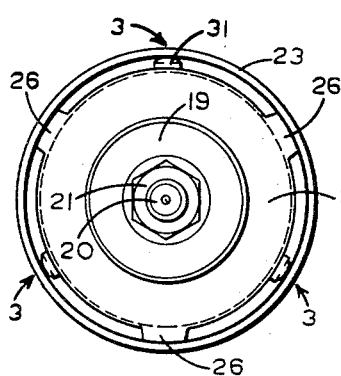
FIGURE 2 is an end view taken in the direction of the arrow A of FIGURE 1.
Figure 3:
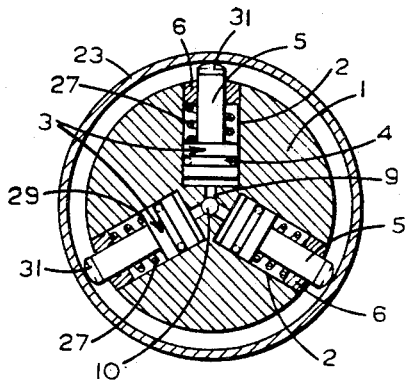
FIGURE 3 is a cross section taken on the line 3—3 of FIGURE 1.

Referring to FIGURES 1 to 3 an embodiment of the invention in the nature of a mandrel is shown in which the body part 1 may be of plain cylindrical (or hexagonal) exterior form and provided with a series of radial bores 2 therein each for receiving a plunger 3 in a fluidtight manner. Sealing means are preferably provided between the plungers 3 and their bore walls such as O-type sealing rings 4 carried by annular grooves therefor preferably about the plungers 3 or in the bore walls.

As shown the plungers 3 may be symmetrically arranged in rows longitudinally of the body part 1 and equally spaced about the periphery of the latter. The outwardly directed or radial plungers 3 provided in this way each have a limited degree of axial movement but are preferably retained against movement fully out of the body part 1.

In a convenient manner of effecting such retention the outer ends or head portions 5 of the plungers 3 are reduced and pass through corresponding holes in retaining members 6 such as plates or strips screwed or otherwise suitably secured on or recessed in the body part 1. Thus as shown one plate or strip 6 may serve to retain a row of plungers 3 along the periphery of the body part 1.

The plunger bores 2 are intercommunicated within the body part 1 by a series of passageways which may comprise radially disposed branch passageways 9 communicating with a longitudinal passageway 10 at or near the axis of the body part 1. The said central or main passageway 10 may receive a removable filler plug 11 e.g. at one end of the body part 1, for which purpose it is either off set or eccentric to the axis or as shown well recessed so as not to interfere with a centering recess 12 at that end. Further plugged filling or bleeding openings may be provided such as at 13 and communicating with the internal passageway system 9, 10 and plunger bore 2 so that the said system and bores may be charged with a body of fluid such as hydraulic oil so as to be common to all the plungers 3.

If desired the fluid may consist of a viscous or semi-plastic medium having suitable rheological properties such as that known as silicone putty or "bouncing putty" in which event the degree of fluidtight operation of the plungers 3 need not be so great and the use of sealing rings 4 dispensed with.

In order to operate the plungers 3, means are provided for applying pressure to the body of fluid, such means being preferably self-contained with the body part 1.

Such self-contained pressure application means may consist of a further plunger or preferably a series of plungers 15 provided at one end of the body part 1 in bores 16 therefor that may be conveniently parallel to the axis of the latter and contained within the overall diameter of the body part 1. The said end bores 16 communicate by passageways 17 with the internal passageway system 9, 10 already described so that the plungers 15 are also in contact with the common body of fluid. Thus an end plunger 15 may correspond to a radial plunger 3 or a row of the latter.

In order to apply pressure to the end plungers 15 a pressure member is provided which may consist of a disc or washer 19 preferably spherically recessed or grooved or otherwise suitably formed for seating contact with the plunger heads. The washer or disc 19 is disposed about an axial shank or study 20 extending from the said end of the body part 1 which shank 20 is threaded to receive a nut 21 which in turn bears against the washer 19 so that on tightening the nut 21 it thrusts the washer 19 against the heads of the end plungers 15 to move the latter in an inward axial direction relative to the body part 1. This causes displacement of fluid within the body part 1 and transfer of pressure to the radial plungers 3 for outward movement of the latter. The washer 19 may carry or have integral therewith a cover sleeve 22 about the end plungers 15.

In use in locating or holding a hollow cylindrical workpiece 23 for external machining purposes the body part 1 complete with the radial plungers 3 in a retracted position is inserted within the work piece 23 and in order to locate the body part 1 co-axially in relation to the latter, locating elements are desirably provided which may take the form of washers or the like 24 fitting one each at or near the end of the body part 1 such as about reduced end portions 25 of the latter. The peripheries or peripheral portions 26 of the locating elements 24 are machined or finished so as to have an accurate locating fit within the work piece 23.

The locating elements 24 should be removably mounted on the end portions 25 such as by screw threaded engagement therewith as shown.

With the body part 1 located within the work piece 23 by means of the locating elements 24 pressure is then applied to the body of fluid such as by tightening the aforesaid nut 21 so that the radial plungers 3 are moved outwardly into firm head contact with the inner periphery of the work piece 23. By such location or holding of the work piece 23 by the plungers 3 machining may be carried out by mounting the body part 1 between centres. It is found that after the radial plungers 3 have been brought into firm contact with the work piece 23 that the locating elements 24 can be removed and for this purpose they are preferably of gapped or spider form shown (FIGURE 2). After their removal concentricity and firm holding of the work piece 23 is maintained by means of the radial plungers 3 for machining purposes whilst removal of the locating elements 24 permits some internal machining of the work piece 23 to be carried out adjacent the ends thereof.

Where the hollow work piece has a taper bore, locating elements 24 of corresponding size are at least initially employed in locating the body part 1 co-axially within the work piece. On application of pressure to the body of fluid the radial plungers 3 automatically accommodate themselves on outward movement to the taper bore of the work piece for firm contact with the latter.

It will be appreciated that the pressure with which the plungers 3 contact the work piece 23 can be controlled by the extent to which the nut 21 is tightened. Whereas screw mechanism is usually the most convenient for the purposes of operating the device other suitable mechanisms may be employed e.g. a lever and cam or like arrangement for quickly applying and releasing pressure.

In order to ensure proper retraction of the radial or work piece engaging plungers 3 for the purposes of removing the device from a work piece 23 or inserting it therein, the said plungers 3, and preferably the end plungers 15 as well, are spring loaded. Thus each radial plunger 3 may be urged in a direction into the body part 1 such as by a compression spring 27 acting between its retaining plate 6 and an abutment such as a shoulder 29 on the plunger i.e. the spring 27 may be disposed about the reduced head portion 5 of the plunger 3 within the body part 1.

In the case of each end plunger 15 it may be spring urged outwardly and against the pressure member or washer 19 such as by a compression spring 30 acting between the inner end of each said plunger 15 and the inner end of its bore 16. Thus immediately the nut 21 is slackened the end plungers 15 are allowed to be urged outwardly by the springs 30 which relieves the body of fluid of pressure and permits retraction of the radial plungers 3 under the action of their springs 27.

Devices according to this invention may be produced with body part 1 of a length and/or diameter to suit various sizes or ranges of sizes of work pieces and where a tubular work piece is of considerable length two devices may be employed one in each end of the work piece.

Whereas it is more convenient and better practice to dispose the holding or locating plungers 3 and their bores 2 radially in respect to the body part 1, if desired they may be similarly arranged for outward or work piece engaging movement such as in a chordal manner.

The actual plunger heads 31 may be of rounded, conical or other suitable form for contact or engagement with a work piece and may be knurled or otherwise finished for such contact in a non-slip manner. The heads 31 may be either integral with the plunger 3 or detachable for interchangeability. The plungers 3 may be also constrained against rotation in their bores 2 such as by non-circular engagement of their head portions 3 through retaining members or plates 6.

Figure 4:
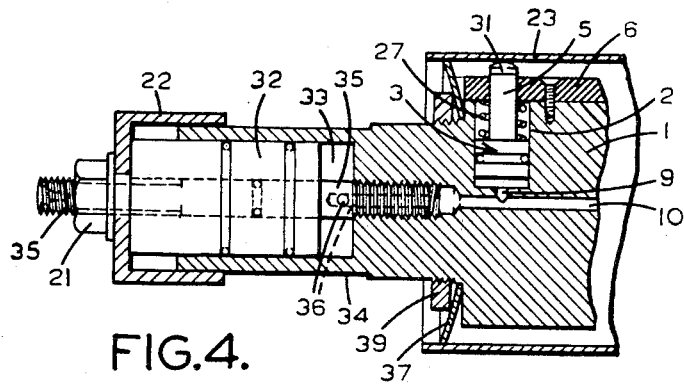
FIGURE 4 is a detail elevation in axial plane section of modified pressure application means.

Referring to FIGURE 4 a modification is shown as regards the arrangement of applying pressure to the body of fluid within the body part 1. In this case a single preferably co-axial piston 32 has a fluid tight sliding fit in a bore 33 therefor in an extension 34 of the body part 1. The piston 32 also has a fluid tight sliding fit about a preferably co-axial stud 35 carried by the body part extension 34 and extending along and beyond the bore 33 where it receives a nut 21.

Tightening of the nut 21 thrusts the piston 32 in an inward direction into the bore 33 causing explusion of fluid from the latter into the central passageway 10 of the body part 1 via the transverse and axial passageways 36 in the inner end portion of the stud 35. Thus by such operation of the piston 32 the radial plungers 3 are thrust outwardly for engagement with the work piece 23. The piston 32 may be urged in the opposite or return direction by a spring (not shown) or positively coupled to the nut for such movement whilst a protective cover is shown provided at 22.

In a further modification shown in FIGURE 4 a locator element or washer 37 of dished form is shown together with a retaining ring nut 39 threaded about the body part extension 34. On tightening the ring nut 39 the locator element tends to be flattened causing some radial expansion whereby its peripheral edge (or peripheral edge portions) are brought into contact with the inner periphery of the work piece for co-axially locating the latter relative to the body part 1. Conversely on slackening the ring nut 39 the locator element 37 is able to contract away from peripheral contact with the work piece 23 for withdrawal or insertion purposes.

Figure 5:
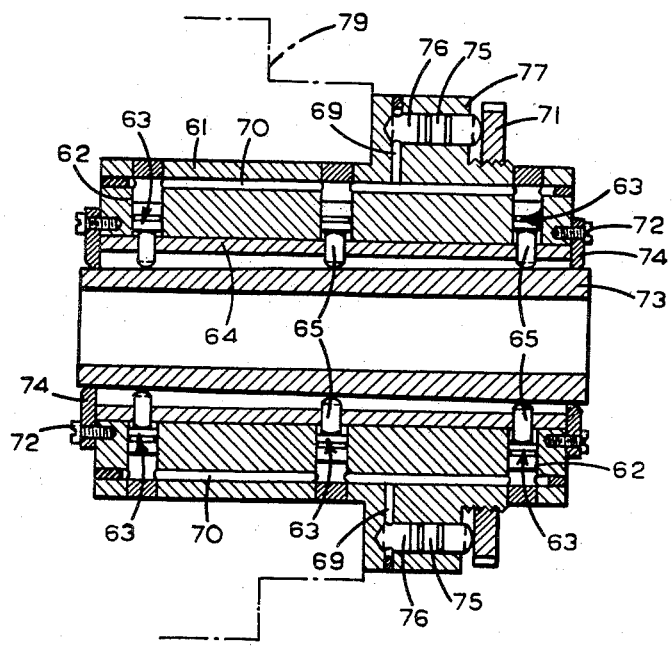
FIGURE 5 is an axial plane section of a further embodiment of the invention.

In an alternative embodiment of the invention shown in FIGURE 5 the body part 61 may be of tubular form having inwardly directed radial plungers 63 extending from the inner peripheral face thereof, the plunger bores 62 being intercommunicated by passageways 70 which as shown may be within the body part 61.

Several rows (e.g. three or four) of plungers 63 may be provided along the inner periphery of the body part 61 and on application of pressure to a body of fluid within and common to the passageways 70 and bores 62, the plungers 63 are moved axially in an inward direction into contact with a work piece such as that shown at 73 which has an external periphery of taper form and to which the plungers 63 accommodate themselves.

The work piece is at least initially located co-axially in relation to the body part 61 by locator elements in the form of rings 74 secured by screws 72 or otherwise preferably removably mounted on the body part at each end. The effective internal diameter of each locator ring 74 is complementary to the diameter of the corresponding end portion of the work piece 73.

In order to apply pressure to the body of fluid within the body part 61 pressure application operating means may consist of plungers 75 slidable in a fluid-tight manner in bores 76 therefor provided in an enlargement 77 of the body part 61. A ring nut 71 threaded on the adjacent end of the body part 61 bears against the plungers 75 and on tightening causes axial inward movement of the plungers 75 displacing fluid from the bores 76 along the passageways 69 to the passageways 70 and hence to the bores 62.

Plungers 75 may be provided one to each row of radial plungers 63, the several plungers 75 so provided being actuated by a common ring nut 71. On slackening the latter pressure is released and the radial plungers are able to retract away from contact or engagement with the work piece 73. Return springs for this purpose may be provided in the manner already described.

The body part 61 may be held at its exterior in a chuck indicated at 79 or mounted on a face plate whereby the work piece 73 may be firmly held within the body part for internal machining and also for some external machining adjacent one or both of its ends on removal of the locator rings 74.

The passageways 69, 70 and plunger bores 62 may be provided by suitably boring and plugging the body part 61 whilst the plungers 63 may be retained against movement fully out of their bores 62 by a retaining member which may either consist of a strip or plate to each row of plungers or more conveniently a suitably perforated sleeve 64 within the body part 61 and common to the reduced portions 65 of all the plungers 63.

I claim:

1. A holding device for an article such as a work piece of cylindrical form comprising a body part having a plurality of bores disposed in radial directions therein, said bores being open at one end thereof whilst the other ends of said bores are inter-communicated in the body part for receiving a body of fluid common to all of said bores; plungers slidably received in a fluid tight manner one in each of said bores so that the heads of said plungers extend in radial directions relative to the body part whilst the other ends of said plungers are disposed for action thereon by an aforesaid body of fluid; operating means for applying pressure to an aforesaid body of fluid in said body part whereby the plungers may be caused to move in their bores for head contact with a periphery of a said article; and removable co-axial locator elements mounted one at each end of the body part for peripheral contact with a said work piece in order to at least initially locate the latter co-axially relative to the body part in readiness for holding contact by the radial plunger heads.

2. A holding device for a work piece of cylindrical form comprising a body part for rotatable mounting about its axis, said body part having a plurality of bores disposed in radial directions therein and having at least one end bore therein, said bores being open at one end thereof whilst the other ends of said bores are intercommunicated in the body part for receiving a body of fluid common to all said bores; plungers slidably received in a fluid tight manner one in each of said radial bores so that the heads of said plungers extend in radial directions relative to the body part whilst the other ends of said radial plungers are disposed for contact by an aforesaid body of fluid; an operating plunger slidable in said end bore against an aforesaid body of fluid for applying pressure thereto in order to cause operative movement of the radial plungers in their bores for head contact with a periphery of a work piece; screw means carried by the body part for imparting axial movement to said operating plunger; and removable co-axial locator elements mounted one at each end of the body part for peripheral contact with a said work piece in order to at least initially locate the latter co-axially relative to the body part in readiness for holding contact by the radial plunger heads.

References Cited in the file of this patent

UNITED STATES PATENTS

| | | |
|---|---|---|
| 2,321,146 | Jones | June 8, 1943 |
| 2,323,091 | Johnston | June 29, 1943 |

FOREIGN PATENTS

| | | |
|---|---|---|
| 1,101,197 | France | Apr. 20, 1955 |